Patented May 30, 1944

2,350,056

UNITED STATES PATENT OFFICE 2,350,056

INTERNAL-COMBUSTION ENGINE

Marion Mallory, Detroit, Mich.

Application October 24, 1942, Serial No. 463,155

12 Claims. (Cl. 123—53)

This invention relates to an internal combustion engine and more particularly contemplates an improvement upon the invention shown in my prior Patent No. 2,280,712.

It is well known that the higher the compression (short of detonation or preignition) at which an internal combustion engine operates, the greater the efficiency of the engine. The normal or highest compression at which a throttle controlled internal combustion engine operates occurs with wide open throttle at low engine speeds, say, e. g., in the neighborhood of 500 to 1500 R. P. M. This is because the piston is traveling at low speed, which gives the charge ample time to flow through the intake passageway and completely fill the cylinder. The engine operates on a much lower compression when the charge is being throttled, because, to reduce the charge reduces the compression; the same as increasing the charge increases the compression. The engine also operates on a lower compression at high speed with a wide open throttle than it does at low speed with a wide open throttle due to the fact that the piston travel is so fast there is not enough time to overcome the inertia of the charge flowing through the intake passageways to fully charge the cylinder.

As above stated, the higher the compression (short of detonation or preignition) at which an internal combustion engine operates, the greater the efficiency of the engine. However, there are varying conditions under which engines must operate, such as high altitude, low altitude, high temperatures and low temperatures. For example; supposing an engine was built to operate in high altitude having a compression just short of detonation or preignition, and then the engine was brought into a low altitude. The compression would be entirely too high because the air at low altitude is heavier and more dense than the air in high altitudes. Naturally, a heavier or greater charge would be drawn into the engine, causing detonation or preignition. Then supposing an engine was built to operate in a low temperature with a compression just short of detonation or preignition. This same engine would detonate or preignite badly when operating in a high temperature, because the engine runs hotter in a high temperature than it does in a low temperature due to the fact that the charge drawn in is warm, having little cooling effect on the valves and combustion chamber, and the temperature of the water used for cooling always follows the outside temperatures. An example is, engines run cooler in the winter than they do in summer, and always detonate or preignite worse in summer than they do in winter because the charge is compressed into a hotter combustion chamber, having hotter exhaust valves and pistons.

Engines having large cylinders and pistons preignite or detonate more than engines having small cylinders and small pistons, because the large pistons do not conduct the heat to the water jackets of the cylinder as rapidly as do the small pistons. In fact, the combustion chamber runs hotter in the large cylinder engines than it does in the small cylinder engines due to the lack of heat radiation to the water jacket from the large combustion chamber. For this reason, lower compression ratios must be used in large cylinders than in small cylinders.

Furthermore, if large cylinders are used, the explosion shocks (due to such a large charge being ignited all at once) cause roughness of the engine and undue stresses on the bearings. To break up this explosion roughness, the six, eight and even twelve-cylinder engines came into use. However, the large number of cylinders used in the present day engines to break up the power pulsations require a large space. If the cylinders are straight in line, the engine is too long. If the cylinders are placed in V formation, the engine is too wide. The crankshaft on an in-line, eight-cylinder engine is expensive due to its length and large number of crankthrows required. The crankshaft on an eight or twelve-cylinder V-type engine is expensive due to the large number of crankthrows required. Furthermore, the V type engine requires two independent cylinder heads, a complicated manifold system, as well as taking up a lot of space in width.

One object of this invention is to prevent a great reduction in compression when the charge of the engine is being throttled or reduced, to prevent a great increase in compression when the throttle is wide open at low engine speeds and prevent a reduction in compression when the throttle is wide open at high engine speeds.

The second object is to prevent a variation in compression between high and low altitude.

The third object is to vary the compression so that the compression will be lower when the engine is working in high temperatures than it is when the engine is working in low temperatures.

The fourth object is to break up the explosion impulses by a method that is less expensive than doing it by the present-day method.

Figures 1, 2:
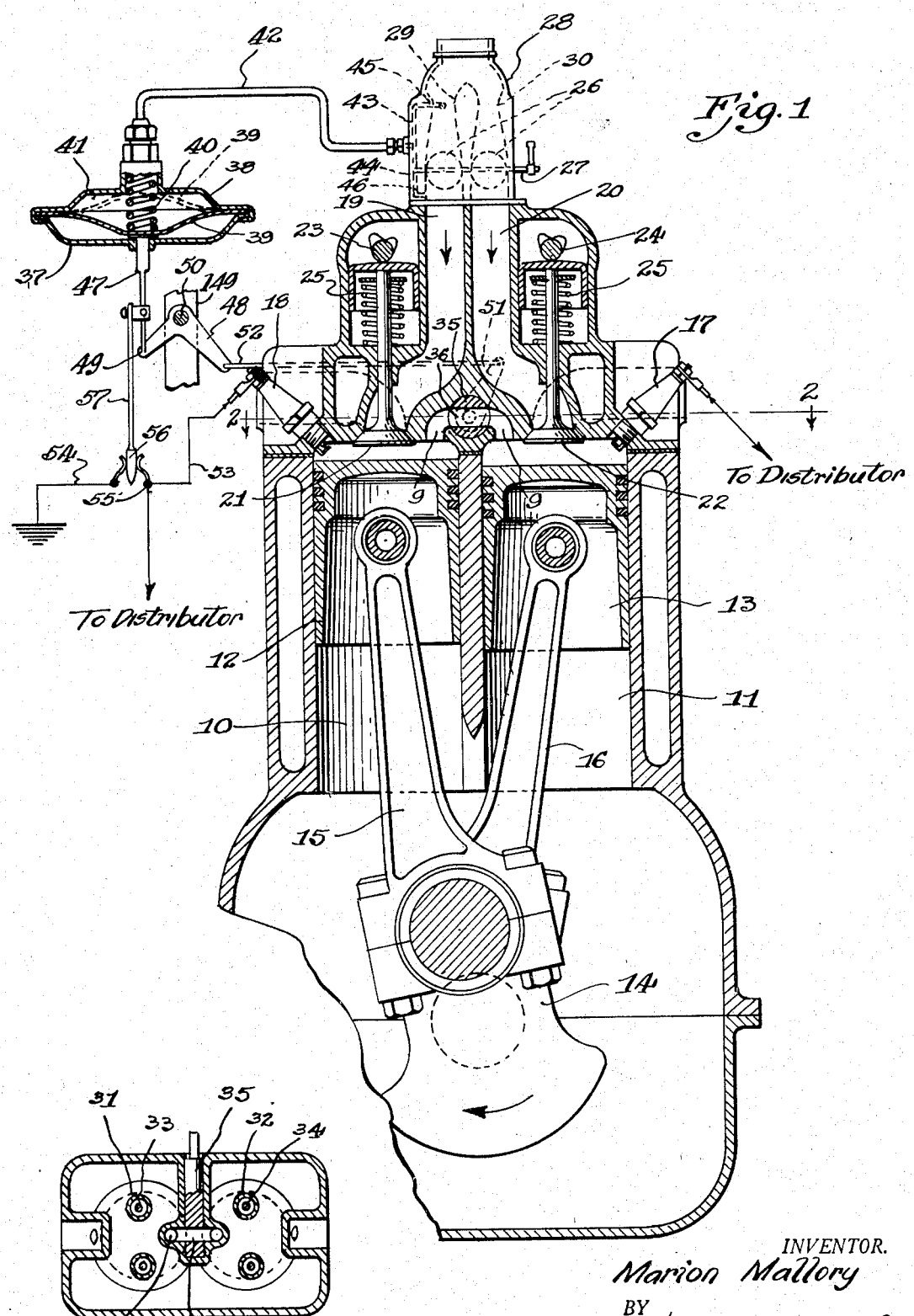
Fig. 1 shows a vertical section through my improved engine.
Fig. 2 is a section along the line 2—2 of Fig. 1.

My engine, except for the improvements described below, is substantially identical with that shown in my prior Patent 2,280,712, and comprises cylinders 10 and 11 which, for purposes of description rather than by way of limitation, are of the same size. The upper ends of the cylinders above the pistons are arranged to communicate through a controlled restriction in the form of passageway 9 and valve 35. The cylinders 10 and 11 are provided with the usual pistons 12 and 13 which are operated by a common crankshaft 14 (rotating in the direction indicated by the arrow) by connecting rods 15 and 16 respectively. The pistons are preferably arranged so that piston 12 leads piston 13. Cylinder 11 is provided with an electric spark plug 17 for igniting the fuel and air mixture in the combustion chamber of cylinder 11. Cylinder 10 is also provided with an electric spark plug 18 for the same purpose.

Cylinders 10 and 11 are provided with intake manifold passageways 19 and 20 respectively, preferably of identical sizes. Manifold passageway 19 communicates with cylinder 10 through an intake port controlled by intake valve 21 and manifold passageway 20 communicates with cylinder 11 by an intake port controlled by the intake valve 22. The two intake valves 21 and 22 are opened by cams 23 and 24 respectively and closed by the usual compression springs 25. Manifold passageways 19 and 20 are controlled by butterfly throttle valves 26 fixed to a common shaft 27 and opened and closed in unison. As shown, the throttle valves are wide open.

The engine is provided with a duplex carburetor generally designated 28 which is connected with a source of liquid fuel (not shown) in the customary manner and provided with the customary fuel nozzles (not shown). The carburetor is provided with venturis 29 and 30 respectively positioned in pasageways 19 and 20.

Cylinders 10 and 11 are each provided with conventional exhaust passageways 31 and 32 controlled by conventional exhaust valves 33 and 34. The exhaust valves are opened and closed in the well known manner by cams mounted on the same shafts on which cams 23 and 24 are mounted.

For varying the restriction or opening and closing of passageway 9 between the two cylinders, a valve 35 is mounted in the cylinder head and provided with a port 36. Valve 35 is controlled by a suction device generally designated 37 and comprising a housing 38 with a flexible diaphragm 39 and a compression spring 40 mounted therein. Flexible diaphragm 39 cooperates with housing 38 to form a chamber 41 which communicates only with intake passageway 19 by means of conduit 42 which communicates with passageways 43 and 44 in the carburetor housing.

Passageway 43 terminates at orifice 45 in the venturi and passageway 44 terminates at orifice 46 in the intake passageway 19 positioned at all times on the engine side of the throttle valve 26. A rod 47 is fixed at one end to diaphragm 39 and the other end of the rod is connected to bell crank 48 as at 49. Bell crank 48 is pivotally mounted on support 149 as at 50. A crank arm 51 is fixed on the outer end of valve 35. The arm 51 is connected with bell crank 48 by means of link 52.

Spark plug 18 is connected to the distributor by line 53. Spark plug 18 is arranged to be shut off by short circuiting or grounding line 53. To this end there is provided a wire 54 leading to ground. Wires 53 and 54 are connected to resilient switch terminals 55 arranged to be bridged by switch member 56 mounted on rod 57 fixed to plunger 47 as described below.

The operation of the engine is as follows: Assuming the engine is working with wide open throttle as indicated in Fig. 1 and at a speed between 500 and 1500 R. P. M., the pistons will be traveling comparatively slowly, permitting a full charge to be drawn into the cylinders. As the vacuum in the intake passageway of the carburetor wil be low under these low speed conditions, the spring 40 through bell crank 48 and rod 52 will open communication 9 between the two cylinders. Link 57 will cause switch 56 to short circuit or cut out the electric ignition in cylinder 10. The spark plug 17 will ignite the charge in cylinder 11 and the flame from the explosion passing from the cylinder 11 into the cylinder 10 will ignite the charge in cylinder 10. If the throttle is held open, the engine speed will increase, and, as the speed further increases from 1500, the velocity through the carburetor venturi 29 will create a suction in the suction device 38 which tends to move valve 36 towards a closed position as the speed of the engine increases and opens switch 56 to permit electric ignition to take place in cylinder 10.

It will be understood that switch 56 does not break contact to permit electric ignition to take place in cylinder 10 until valve 36 is closed or almost closed. The diaphragm may move a considerable distance before the electrical contact is broken because the switch blades 55 are long. As long as the opening between the two cylinders is great enough that the explosion from the cylinder 11 will ignite the charge in cylinder 10, electric ignition is not used.

If the engine speed is decreased by closing the throttle 26, the vacuum will increase below the throttle 26 and cause the suction device to close valve 35. The cylinders then work independent of each other and are ignited by electric ignition independent of each other. The spark occurs in cylinder 10 in advance of the spark in cylinder 11; thereby breaking up the power pulsations. It will be understood that when valve 35 is at an open position as shown, the ignition in cylinder 10 is caused by the flame from the explosion in cylinder 11, but even then there is a lag or a difference in the ignition time between the two cylinders, which tends to break up the power pulsation.

The compression of the engine is controlled so as to reduce the compression at wide open throttle between 500 and 1500 engine speed, and to increase the compression as the speed moves above 1500 and also to prevent such a reduction in compression when the throttles are moved toward a closed position to restrict the charge, in the following manner:

Assuming that the combustion space above each piston was so small that the compression ratios would be 9 to 1 if there was no communication between the two cylinders, in other words, if valve 35 had communication 9 closed. Now assume that valve 35 had communication 9 open. The compression ratio in each cylinder perhaps would drop to a six to one (6 to 1) ratio due to the fact that piston 12 leads piston 13 and forces part of the charge above piston 12 into cylinder 11. As piston 13 moves upwardly, some of the charge is vented back into cylinder 10, and when explosion takes place, some of the burning charge is vented back to prevent excessive pressures over piston 13, and, as explained, the low vacuum in the intake passageway of the carburetor caused by throttle valve 26 being open at low engine speeds opens the communication between the two cylinders, which has the effect of reducing the compression to normal at low engine speeds and wide open throttle.

If the throttles 26 are moved towards a closed position, the vacuum in the suction device 38 will increase, causing valve 35 to move towards a closed position, which prevents diminishing of the compression because the charge is restricted from venting out of cylinder 10 into cylinder 11, as well as being restricted from venting out of cylinder 11 back into cylinder 10. It can be seen that the diminishing of the compression below the normal desired compression (i. e., the highest pressure feasible short of detonation or preignition) will be greatly reduced or minimized as the charge is restricted by closing the throttles and that the increasing of the compression will be decreased or minimized when the charge is increased by opening the throttles and that the diminishing of compression which usually occurs when the throttles are opened at high engine speeds will be decreased or minimized. Thus, under all operating conditions, the engine is run at an efficient compression.

With this same engine, if desired, the suction device 38 can be disconnected from crank 51 and valve 35 moved to fully closed position and the engine operated with valve 35 closed. In such case, switch 56 will be open so that spark plug 18 will fire a few degrees before piston 12 reaches dead center and spark plug 17 will fire a few degrees before piston 13 reaches dead center. When operated thusly the power curve of piston 13 will lag a few degrees behind the power curve of piston 12 so that as the power curve of piston 12 begins to decline sharply the power curve of piston 13 will begin to climb sharply towards its peak. This will tend to make the engine operate with greater smoothness, particularly where the engine comprises four or more power units where each unit is represented by cylinders 10 and 11.

By the drawing, it can be seen that this engine can be built very compact, not much wider than the in-line engine and no longer than the V type engine. It has one cylinder head and a very simple manifolding system. If it were an eight-cylinder engine, the common short four-cylinder crankshaft is used.

I do not wish to be limited at the degrees piston 12 leads piston 13. If I desire piston 12 to have a greater lead, connecting rod 16 can be pivoted to the bearing cap of connecting rod 15 instead of on the crank pin.

Neither do I desire to be limited to controlling valve 35 by the engine intake pressures. This valve can be controlled for high altitudes manually or controlled by atmospheric pressures in high altitudes. For high altitudes it can be closed and electric ignition can be used in both cylinders. For low altitude, the valve 35 can be open and electric ignition used only in cylinder 11. For temperature changes, the valve 35 can be controlled by a thermostat.

I claim:

1. In an internal combustion engine comprising two cylinders, a piston for each of said cylinders, the one piston leading the other piston, each cylinder having a valve controlled intake port and a valve controlled exhaust port for charging and exhausting said cylinders, a restricted passageway between the two cylinders, a valve controlling said passageway, and means tending to move said last mentioned valve toward closed position when the charge for the said cylinders is insufficient to maintain a predetermined compression in the cylinders with the restriction open.

2. The combination as claimed in claim 1 including electrical ignition means for each of the cylinders, the said electrical ignition means for the cylinder containing the leading piston being turned off when the restricted passageway is open.

3. In an internal combustion engine comprising two cylinders, a piston for each of said cylinders, one of said pistons leading the other, an exhaust port and an intake port for each cylinder, valves for controlling said ports, an intake passageway, a restricted passageway between the two cylinders, a valve for controlling said passageway, and means responding to pressure conditions in the intake manifold for controlling said last mentioned valve, said means moving said valve in the restricted passageway toward closed position when the intake manifold pressure is low.

4. In an internal combustion engine comprising two cylinders, a piston for each of said cylinders, one of said pistons leading the other, an exhaust port and an intake port for each cylinder, valves for controlling said ports, an intake passageway, a throttle valve for said intake passageway, a restricted passageway between the two cylinders, a second valve controlling said restricted passageway, and means responding to pressure conditions in the intake passageway on the engine side of the throttle valve for moving said second valve toward closed position when the throttle valve is in idle position or partly open, said means moving said second valve toward open position when the throttle valve is open and the pressure is relatively high in the intake passageway whereby the restricted passageway serves primarily for venting compressed fuel mixtures out of the cylinder having the leading piston into the cylinder having the lagging piston during the compression stroke of the leading piston and to vent burning gases from the cylinder having the lagging piston back into the cylinder having the leading piston to ignite the fuel charge in the cylinder having the leading piston.

5. The combination as claimed in claim 4 including electrical ignition means for each of the cylinders for firing the fuel mixture in the cylinders before their respective pistons reach dead center, and means for shutting off the electrical ignition means for the cylinder having the leading piston whenever the restricted passageway is partly or fully open.

6. In an internal combustion engine comprising two cylinders, a piston for each of said cylinders, one of said pistons leading the other, an exhaust port and an intake port for each cylinder, valves for controlling said ports, an intake passageway, a throttle valve for said intake passageway, a restricted passageway between the two cylinders, a second valve controlling said restricted passageway, suction means connected into the intake passageway both on the engine side and the atmosphere side of said throttle valve for controlling said second valve whereby the suction means moves the second valve toward closed position when the throttle valve is closed and when the engine is running at relatively high speed with the throttle valve open.

7. In an internal combustion engine comprising two cylinders, a piston for each of said cylinders, one of said pistons leading the other, an exhaust port and an intake port for each cylinder, valves for controlling said ports, an intake passageway, a throttle valve for said intake passageway, a restricted passageway between the two cylinders, a second valve controlling said restricted passageway, a venturi in the intake passageway on the atmosphere side of the throttle valve, a suction device connected into the venturi and into the intake passageway on the engine side of the throttle valve for moving said second valve toward closed position when the throttle valve is closed and a relatively high vacuum is created in the intake passageway on the engine side of the throttle valve, said suction means also moving the second valve toward closed position when the engine is running at high speed and a vacuum is created by the air flowing through the venturi.

8. The combination as claimed in claim 7 including electrical ignition means for each of said cylinders, and a switch controlled by said suction means for turning off the electrical ignition in the cylinder having the leading piston whenever said second valve is partly or fully open.

9. In an internal combustion engine comprising two cylinders, a piston for each of said cylinders, the one piston leading the other piston, each cylinder having a valve controlled intake port and a valve controlled exhaust port for charging and exhausting said cylinders, an intake passageway, a throttle valve in said passageway, a restricted passageway between the two cylinders, a second valve for controlling said restricted passageway, a suction device, mechanical connections between the suction device and the second valve, a conduit connected into said suction device and communicating with the intake passageway on the atmosphere side of the throttle valve and on the engine side of the throttle valve whereby the suction device opens the second valve when the throttle valve is open and the pressure is high in the intake passageway and whereby the suction device moves the second valve towards closed position when the throttle valves are closed or partly open so that the vacuum is high in the intake passageway on the engine side of the throttle valve.

10. In an internal combustion engine comprising two cylinders, a piston for each of said cylinders, the one piston leading the other piston, each cylinder having a valve controlled intake port and a valve controlled exhaust port for charging and exhausting said cylinders, an intake passageway, a throttle valve in said passageway, a restricted passageway between the two cylinders, a second valve for controlling said restricted passageway, a suction device, mechanical connections between the suction device and the second valve, a venturi in the intake passageway on the atmosphere side of the throttle valve, a conduit for connecting the suction device into the intake passageway on the engine side of the throttle valve and into the venturi whereby the suction device moves the second valve towards closed position when the throttle valve is closed or partly open due to the vacuum being relatively high in the intake manifold and whereby the suction device also moves the second valve toward closed position when the engine is running at a relatively high speed due to the vacuum created in the suction device by the air flowing through the venturi.

11. In an internal combustion engine comprising two cylinders, a piston for each of said cylinders, the one piston leading the other piston, each cylinder having a valve controlled intake port and a valve controlled exhaust port for charging and exhausting said cylinders, a passageway between the two cylinders, individual electrical ignition means for each cylinder, and means for closing said passageway whereby throughout a plurality of cycles of operation of said engine the effective volume of the combustion chamber for each cylinder is decreased and the compression of the charge in each cylinder is controlled.

12. In an internal combustion engine comprising two cylinders, a piston for each of said cylinders, the one piston leading the other piston, each cylinder having a valve controlled intake port and a valve controlled exhaust port for charging and exhausting said cylinders, a passageway between the two cylinders, a valve for controlling said restricted passageway, and means for closing said valve to shut off one cylinder from the other throughout the compression, power, exhaust and intake strokes of said pistons whereby upon a change in the conditions under which said engine is operating a predetermined compression of the charge in said cylinders can be maintained.

MARION MALLORY.